Dec. 15, 1959     R. C. WAY     2,917,253
HANDLE FOR REELS OF WIRE
Filed May 31, 1957
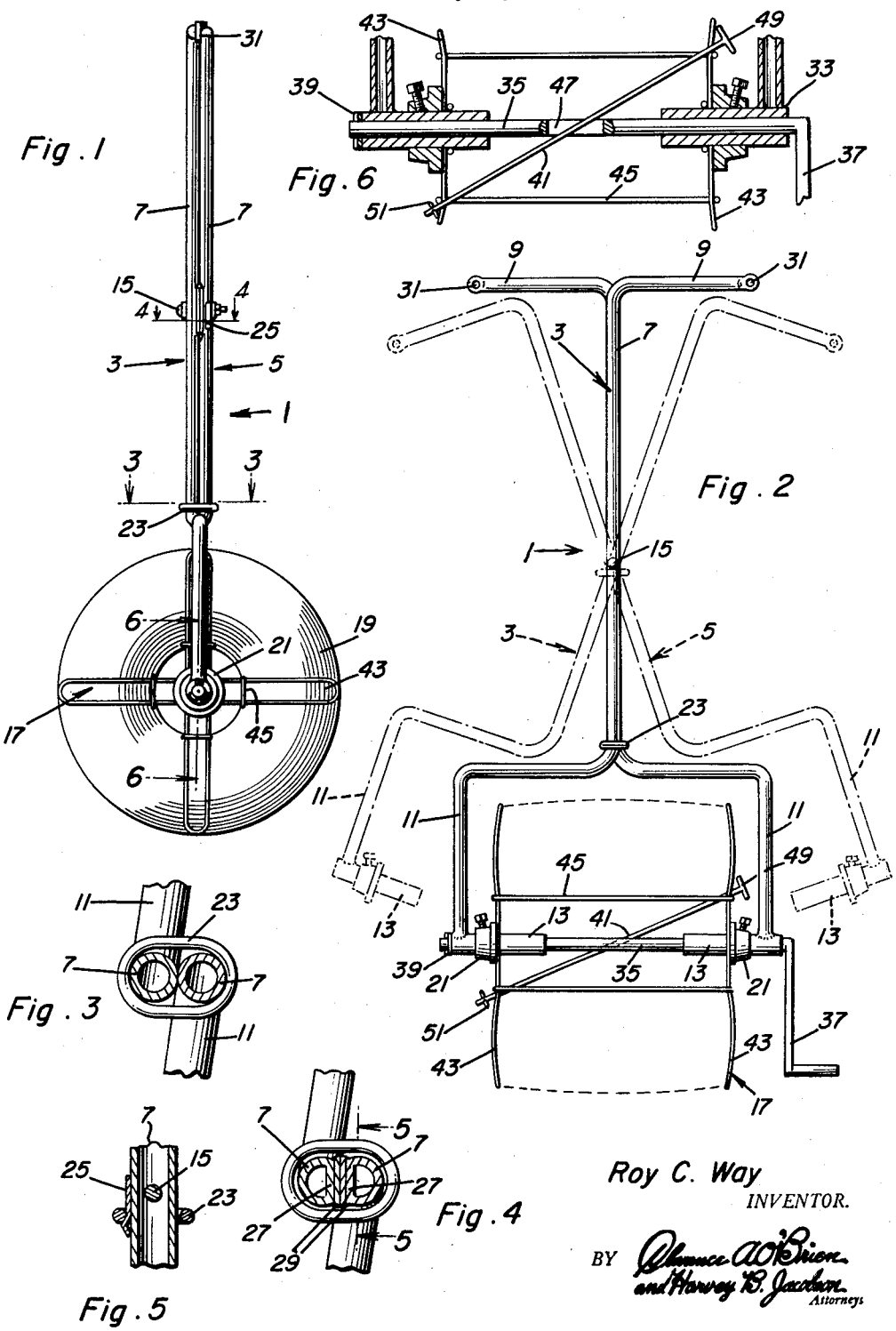
Roy C. Way
INVENTOR.

2,917,253

HANDLE FOR REELS OF WIRE

Roy C. Way, Tennessee, Ill.

Application May 31, 1957, Serial No. 662,921

1 Claim. (Cl. 242—94)

My invention relates to improvements in handles for rolls of barb wire or the like wound upon a reel.

An important object of my invention is to provide a simply constructed handle adapted for easy quick attachment to a reel having a roll of barb wire wound thereon, and by means of which the roll may be easily and safely rolled along the ground, by one man to unwind the wire in a field or be lifted onto a vehicle or other support for rotation of the reel to wind up wire thereon.

To the accomplishment of the above, and subordinate objects presently appearing, my improved handle comprises a tongs having terminal trunnions adapted to be inserted into the ends of a conventional reel of the spool type and which is adapted to be opened and closed scissors fashion to insert and withdrawn the trunnions, together with means for releasably locking the tongs closed, and means for preventing end play of the reel on the trunnions, all as set forth in the following description and claim and illustrated in the accompanying drawing in which:

Figure 1 is a view in side elevation of the handle closed and with the end trunnions inserted in the reel and the tongs locked closed;

Figure 2 is a view in plan of the same with the tongs shown open in dotted lines to withdraw the trunnions;

Figure 3 is an enlarged view in cross-section taken on the line 3—3 of Figure 1;

Figure 4 is an enlarged view in cross-section taken on the line 4—4 of Figure 1;

Figure 5 is a fragmentary view in longitudinal section taken on the line 5—5 of Figure 4; and Figure 6 is an enlarged fragmentary view in vertical longitudinal section taken on the line 6—6 of Figure 1.

Referring to the drawing by numerals, my improved handle comprises a tongs, designated generally by the numeral 1, formed, with the exceptions presently noted, of metal tubing and embodying a pair of like tong sections 3, 5.

The sections 3, 5 each include a straight shank 7 having at its rear end a right angled hand grip portion 9 extending outwardly from one side of the shank 7 and provided at its front end with a similarly extending front hook 11 of square shape extending outwardly from the same side of the shank 7 as the hand grip portion 9 and which terminates in a tubular trunnion 13 extending inwardly toward the shank 7.

The shanks 7 are pivoted together at an intermediate point thereon in superposed relation by a pivot bolt 15, so that the hooks 11 open toward each other, the trunnions 13 confront each other and the hand grip portions extend oppositely relatively, and whereby the sections 3, 5 may be swung oppositely to open and close the tongs 1 scissors fashion.

When the tongs 1 are opened, as shown in dotted lines in Figure 2, the shanks 7 are crossed and the hooks 11 moved apart to receive a reel 17 therebetween with the hooks 11 straddling the reel. When the tongs 1 are closed, the shanks 7 are parallel and the hooks 11 are moved toward each other, and the trunnions 13 may thereby be inserted in the ends of the conventional wire core reel 17 with the hooks straddling the reel 17 and the roll of wire 19 wound thereon.

Set collars 21 are provided on the trunnions 13 for engagement with the ends of the reel 17 to prevent end play of the reel 17 of said trunnions.

The means for locking the tongs closed comprises a slip link 23 on the shanks 7 forwardly of the pivot bolt 15 slidable forwardly on said shanks 7 to the hooks 11 when said shanks 7 are parallel to lock the tongs 1 closed, and slidable rearwardly into an unlocking position adjacent the pivot bolt 15 to unlock said tongs as shown in dotted lines in Figure 2.

A leaf spring catch 25 is suitably secured to one shank 7 adjacent the pivot bolt 15 to releasably retain the slip, or locking link 23 in unlocking position, as shown in Figure 5.

To prevent the sections 3, 5 from tilting crosswise of each other at the pivot bolt 15 and to thereby maintain the trunnions 13 in a common plane so that they may be inserted in the ends of the reel 17, the shanks 7 are provided with confronting countersunk flat portions 27 at opposite sides of the pivot bolt 15 and with opposed bearing plates 29 fixed by welding, not shown, to said flat portions 27 with the pivot bolts 15 extending therethrough.

The operation of my invention will be readily understood. When it is desired to attach the handle to a reel 17, the slip link 23 is slid into unlocking position, as shown in Figure 2 in dotted lines, and the tongs 1 are opened to move the hooks 11 apart. With the tongs held by the hand grip portions 9, the hooks 11 are placed over a roll of wire 19 to straddle the same and the reel 17 and the tongs 1 are then closed to insert the trunnions 13 into the ends of the reel 17. The slip link 23 is then released from the catch 25 and the tongs 1 tilted so that said link 23 will slide into the locking position shown in Figures 1 and 2 in full lines. The tongs 1 may then be lifted by the hand grip portions 9 to lift the roll, or to push or pull the tongs for rolling the roll of wire 19 along the ground for unwinding wire therefrom or for other purposes.

The hand grip portions 9 may be provided with flat apertured terminal ends 31 for fastening the tongs on a suitable support, not shown, such as a cart or tractor in a position for unwinding the wire.

As shown in Figures 3 and 4, the hooks 11 may be bent laterally on the shanks 7 so that the trunnions 13 will be axially aligned when the tongs 1 are closed.

The ends 31 lie in a common plane in the dividing line between the shanks 3 for attachment of the handle to a suitable supporting stand, not shown, with the reel 17 level. The shanks 13 may be formed as welded on parts of the hooks 11 as indicated at 33.

For winding wire on the reel 17 when the handle 1 is suitably supported, a shaft 35 with a hand crank 37 on one end is provided for insertion through the trunnions 13 and through the reel 17 and is provided with a retaining cotter pin 39. The shaft 35 is removably inserted after the handle is attached and of course removed when it is desired to detach the handle. A handle equipped locking rod 41 is provided for locking the reel 17 to the shaft 35. The rod 41 is inserted through the ends 43 of the reel 17 diagonally through the wire core 45 of the reel and a longitudinal slot 47 in said shaft 35. A handle 49 on one end of the rod 41 and a cotter pin 51 in its other end hold said rod in place.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A handle for manipulating a roll of wire on a reel comprising tongs including a pair of like sections including straight shanks pivoted together at an intermediate point thereof for swinging oppositely into parallel and crossed relation to close and open the tongs, a crank shaft for supporting and rotating in the tongs a reel having wire rolled thereon, said shaft having a central slot therein, said shanks having laterally offset front end hooks opening toward each other and having tubular ends to straddle a roll of wire on a reel and journal said shaft through said ends when the tongs are closed, and a rod removably inserted through said slot transversely of said shaft for extension through a reel having a roll of wire thereon to hold said reel on said shaft for rotation thereby.

References Cited in the file of this patent
UNITED STATES PATENTS

| | | |
|---|---|---|
| 723,081 | Turner | Mar. 17, 1903 |
| 1,165,341 | Pettit | Dec. 21, 1915 |
| 1,341,484 | Starratt | May 25, 1920 |